United States Patent
Houghton et al.

(10) Patent No.: US 7,542,465 B2
(45) Date of Patent: Jun. 2, 2009

(54) OPTIMIZATION OF DECODER INSTANCE MEMORY CONSUMED BY THE JITTER CONTROL MODULE

(75) Inventors: Philip Houghton, Surrey (CA); Winnie Lee, Port Moody (CA)

(73) Assignee: Broadcom Corporation, Irvine, CA (US)

( * ) Notice: Subject to any disclaimer, the term of this patent is extended or adjusted under 35 U.S.C. 154(b) by 874 days.

(21) Appl. No.: 10/402,602

(22) Filed: Mar. 28, 2003

(65) Prior Publication Data

US 2004/0190508 A1 Sep. 30, 2004

(51) Int. Cl.
H04L 12/56 (2006.01)
(52) U.S. Cl. .................................... 370/389; 370/395.7
(58) Field of Classification Search ........................ None
See application file for complete search history.

(56) References Cited

U.S. PATENT DOCUMENTS

| | | | | |
|---|---|---|---|---|
| 6,560,233 B1* | 5/2003 | Hatanaka et al. | ............. | 370/401 |
| 6,661,794 B1* | 12/2003 | Wolrich et al. | ............. | 370/394 |
| 6,804,731 B1* | 10/2004 | Chang et al. | ................. | 710/53 |
| 6,847,645 B1* | 1/2005 | Potter et al. | ................. | 370/392 |
| 6,965,975 B2* | 11/2005 | Jeong | ......................... | 711/161 |
| 6,985,853 B2* | 1/2006 | Morton et al. | ............. | 704/201 |
| 7,161,937 B1* | 1/2007 | Dunning et al. | ............. | 370/389 |
| 7,162,416 B2* | 1/2007 | Morton et al. | ............. | 704/201 |
| 7,269,171 B2* | 9/2007 | Poon et al. | ................. | 370/392 |
| 7,308,000 B2* | 12/2007 | Masputra et al. | ........... | 370/469 |
| 2002/0071438 A1* | 6/2002 | Singh | ......................... | 370/398 |
| 2002/0154647 A1* | 10/2002 | Potash | ....................... | 370/412 |
| 2003/0112758 A1* | 6/2003 | Pang et al. | ................. | 370/235 |
| 2003/0219009 A1* | 11/2003 | Unger | ........................ | 370/352 |
| 2004/0042483 A1* | 3/2004 | Elzur et al. | ................. | 370/463 |

* cited by examiner

*Primary Examiner*—Gregory B Sefcheck
(74) *Attorney, Agent, or Firm*—McAndrews, Held & Malloy (57) ABSTRACT

A decoder for decompressing real-time media data streams and a method for operating such a decoder is disclosed. The decoder may comprise a relatively larger first memory for storing compressed data and parameters, and a processor for executing a decompression algorithm, the processor having a relatively smaller second memory. The decompression algorithm may be executed on a periodic basis, and the parameters used to select the data to be decompressed may be moved from the second memory to the first memory each time the decompression algorithm executes. An embodiment of the present invention may use slower, less expensive memory to enable it to support a greater number of real-time media streams than prior art solutions. Another embodiment of the present invention may include machine-readable storage having stored thereon a computer program having a plurality of code sections executable by a machine for causing the machine to perform the foregoing.

30 Claims, 7 Drawing Sheets

OPTIMIZATION OF DECODER INSTANCE MEMORY CONSUMED BY THE JITTER CONTROL MODULE

CROSS-REFERENCE TO RELATED APPLICATIONS/INCORPORATION BY REFERENCE

[Not Applicable.]

FEDERALLY SPONSORED RESEARCH OR DEVELOPMENT

[Not Applicable]

[MICROFICHE/COPYRIGHT REFERENCE]

[Not Applicable]

BACKGROUND OF THE INVENTION

Network traffic for real-time media consists of one or more streams of data packets, each stream supporting one "channel". Each packet of the stream provides a limited amount of playback time for the associated channel. In order to provide continuous playback, the data packets for each channel must arrive at regular intervals. The time that a packet takes to traverse the network varies, however, due to a number of factors. These factors include, for example, the number of nodes, the speed of the communications links, and the queuing delay that occurred at each node in the path. In addition, data packets may be lost in transit. Packet loss and variations in network delay, normally referred to as 'network delay jitter', occur as a part of normal packet network operation. Minimizing the effects of network delay jitter and packet loss on the playback of a real-time media stream is a challenging problem, and involves the buffering of the compressed real-time data at the point of playback for each channel. The buffers used for this purpose are referred to as "jitter buffers".

Each packet in the data stream for a channel includes a small amount of packet header information, and a much larger amount of compressed real-time data, or "payload." Typically, the packet header and the payload are stored together in the jitter buffer for that channel. Although the information in the packet header is used repeatedly by the jitter buffer algorithms, the payload is accessed only when decompression occurs.

The digital signal processors typically used to implement the decompression algorithms have a relatively small amount of fast, internal data memory. When a typical jitter buffer is stored within the internal data memory of the digital signal processor, it occupies a large portion of that space. Each channel that is supported also requires a certain amount of memory space during decompression for program or "instance" variables. The combined memory requirement of the jitter buffer and the instance variables limits the number of channels that may be supported by the internal memory of the typical digital signal processor. As an alternative, the jitter buffer may be stored in a larger external memory. Storing the jitter buffer in external memory, however, slows access to the packet header information needed for the jitter buffer algorithms. The slower access to packet header information reduces processor throughput, limiting the number of channels that may be supported.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be seen in a decoder comprising a processor for executing at least one decompression algorithm, the processor comprising a first memory, and a second memory for storing at least one of the payload data, header data, and algorithm instance data. At least one of the header data, the payload data, and the algorithm instance data may be moved from the second memory to the first memory just prior to the execution of the at least one decompression algorithm, and at least one of the header data and the algorithm instance data may be moved from the first memory to the second memory following the execution of the at least one decompression algorithm. The payload data may comprise speech data, and the header data may comprise at least one of a time stamp, a sequence number, a jitter estimate, and a reference to a location within the second memory.

In an embodiment of the present invention, the size of the first memory may be a small fraction of the size of the second memory. In addition, the first memory may have a relatively higher speed of access and the second memory may have a relatively lower speed of access. The at least one decompression algorithm may be executed on a periodic basis.

Another aspect of the present invention may be observed in a method of operating a decoder for decoding a real-time media stream, the method comprising receiving a plurality of data packets where each of the plurality of data packets may comprise header data and payload data, and parsing each of the plurality of data packets into a header data portion and a payload data portion. The method may further comprise storing the header data portions in a first memory, thereby forming a block of header data, and storing the payload data portions in the first memory, thereby forming a block of payload data. The method may also comprise copying the block of header data to a second memory, decoding at least a portion of the block of payload data using the copy of the block of header data in the second memory, and moving at least a portion of the copy of the block of header data in the second memory back to the first memory.

In an embodiment in accordance with the present invention, the payload data may comprise compressed speech data, and the header data may comprise at least one of a time stamp, a sequence number, a jitter estimate, and a reference to a location within the first memory. In addition, the second memory and a digital signal processor may be contained within a single integrated circuit device. The size of the second memory may be a small fraction of the size of the first memory, and the copying, decoding, and moving may occur on a periodic basis.

Yet another aspect of the present invention may be observed in a machine-readable storage, having stored thereon a computer program having a plurality of code sections for implementing a decoder, the code sections executable by a machine for causing the machine to perform the foregoing.

These and other advantages, aspects, and novel features of the present invention, as well as details of illustrated embodiments, thereof, will be more fully understood from the following description and drawings.

DETAILED DESCRIPTION OF THE INVENTION

The invention described relates in general to the processing of a payload media stream. More specifically, the present invention pertains to the processing of multiple, compressed, real-time media streams in a system with limited high-speed memory.

In an illustrative embodiment of the present invention, a signal processing system is employed to interface voice telephony devices with packet-based networks. Voice telephony devices include, by way of example, analog and digital phones, Ethernet phones, IP phones, interactive voice response systems, private branch exchanges (PBXs) and any other conventional voice telephony devices known in the art. The described embodiment of the signal processing system can be implemented with a variety of technologies including, by way of example, embedded communications software that enables transmission of voice data over packet-based networks. The embedded communications software may be run on programmable digital signal processors (DSPs), and used in gateways, remote access servers, PBXs, and other packet-based network appliances. Although the embodiments described below are with respect to the use of the invention(s) within systems performing voice communication, the embodiments described herein are for illustrative purposes only, as the present invention is not limited in this respect and may have significant utility in systems used for the communication of other real-time media, for example, voice, music, video, etc.

Figure 1:
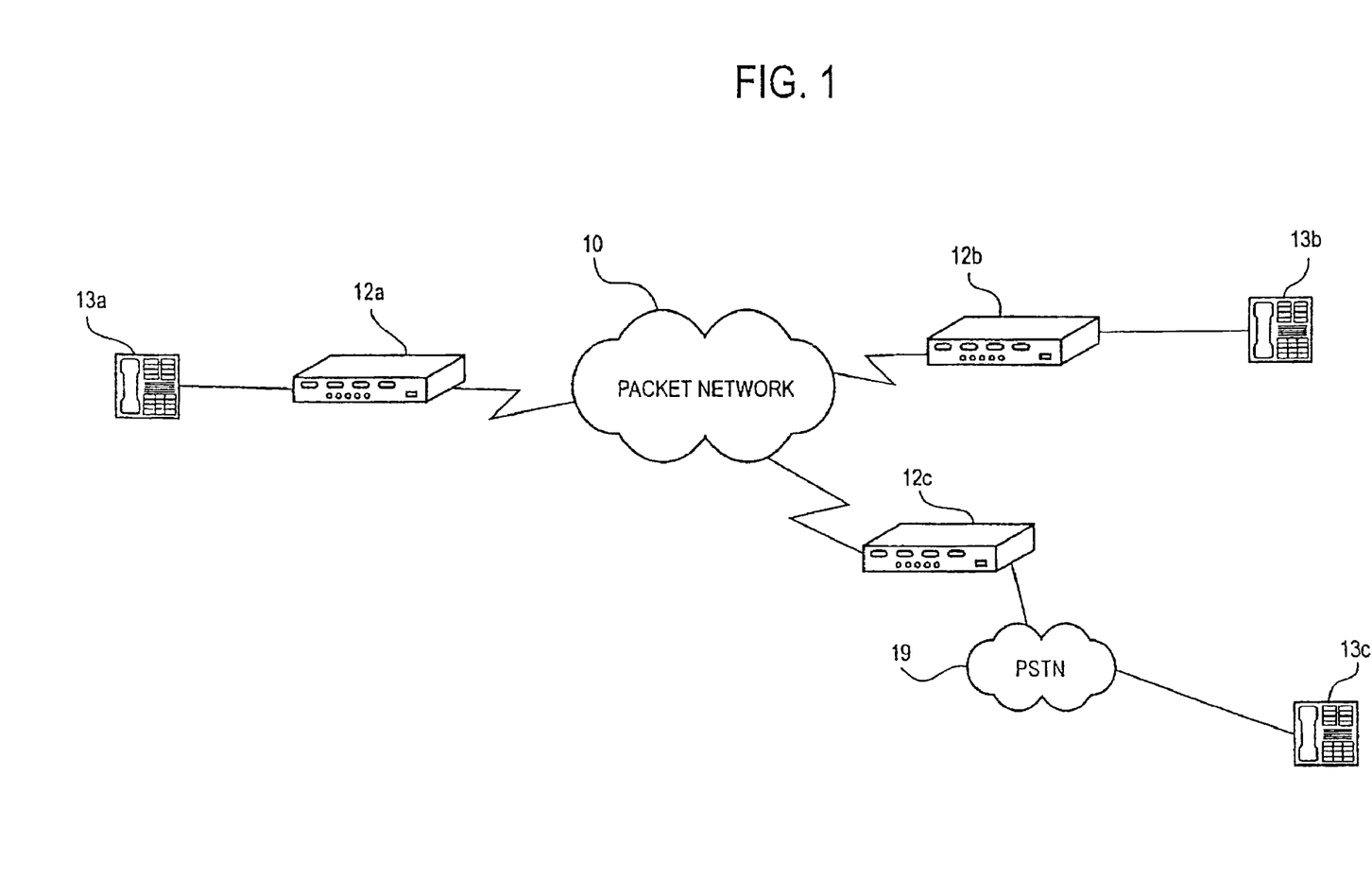
FIG. 1 is a functional block diagram representing a communication system that enables the transmission of real-time media data over a packet-based system.

Referring now to FIG. 1, there is shown a functional block diagram representing a communication system that enables the transmission of voice data over a packet-based system such as voice-over-IP (VoIP, H.323), Voice over Frame Relay (VoFR, FRF-11), Voice Telephony over ATM (VTOA), or any other proprietary network, according to an illustrative embodiment of the present invention. In one embodiment of the present invention, voice data can also be carried over traditional media such as time division multiplex (TDM) networks and voice storage and playback systems. Packet-based network 10 provides a communication medium between telephony devices. Network gateways 12a and 12b support the exchange of voice between packet-based network 10 and telephony devices 13a and 13b. Network gateways 12a and 12b may include a signal processing system that provides an interface between the packet-based network 10 and telephony devices 13a and 13b. Network gateway 12c supports the exchange of voice between packet-based network 10 and a traditional circuit-switched network 19, which transmits voice data between packet-based network 10 and telephony device 13c. In the described exemplary embodiment, each network gateway 12a, 12b, 12c supports a telephony device 13a, 13b, 13c.

Each network gateway 12a, 12b, 12c could support a variety of different telephony arrangements. By way of example, each network gateway might support any number of telephony devices, circuit-switched networks and/or packet-based networks including, among others, analog telephones, Ethernet phones, fax machines, data modems, PSTN lines (Public Switched Telephone Network), ISDN lines (Integrated Services Digital Network), T1 systems, PBXs, key systems, or any other conventional telephony device and/or circuit-switched/packet-based network. In the described exemplary embodiment, two of the network gateways 12a, 12b provide a direct interface between their respective telephony devices and the packet-based network 10. The other network gateway 12c is connected to its respective telephony device through a circuit-switched network such as a PSTN 19. The network gateways 12a, 12b, 12c permit voice, fax and modem data to be carried over packet-based networks such as PCs running through a USB (Universal Serial Bus) or an asynchronous serial interface, Local Area Networks (LAN) such as Ethernet, Wide Area Networks (WAN) such as Internet Protocol (IP), Frame Relay (FR), Asynchronous Transfer Mode (ATM), Public Digital Cellular Network such as TDMA (IS-13x), CDMA (IS-9x), or GSM for terrestrial wireless applications, or any other packet-based system.

Figure 1A:
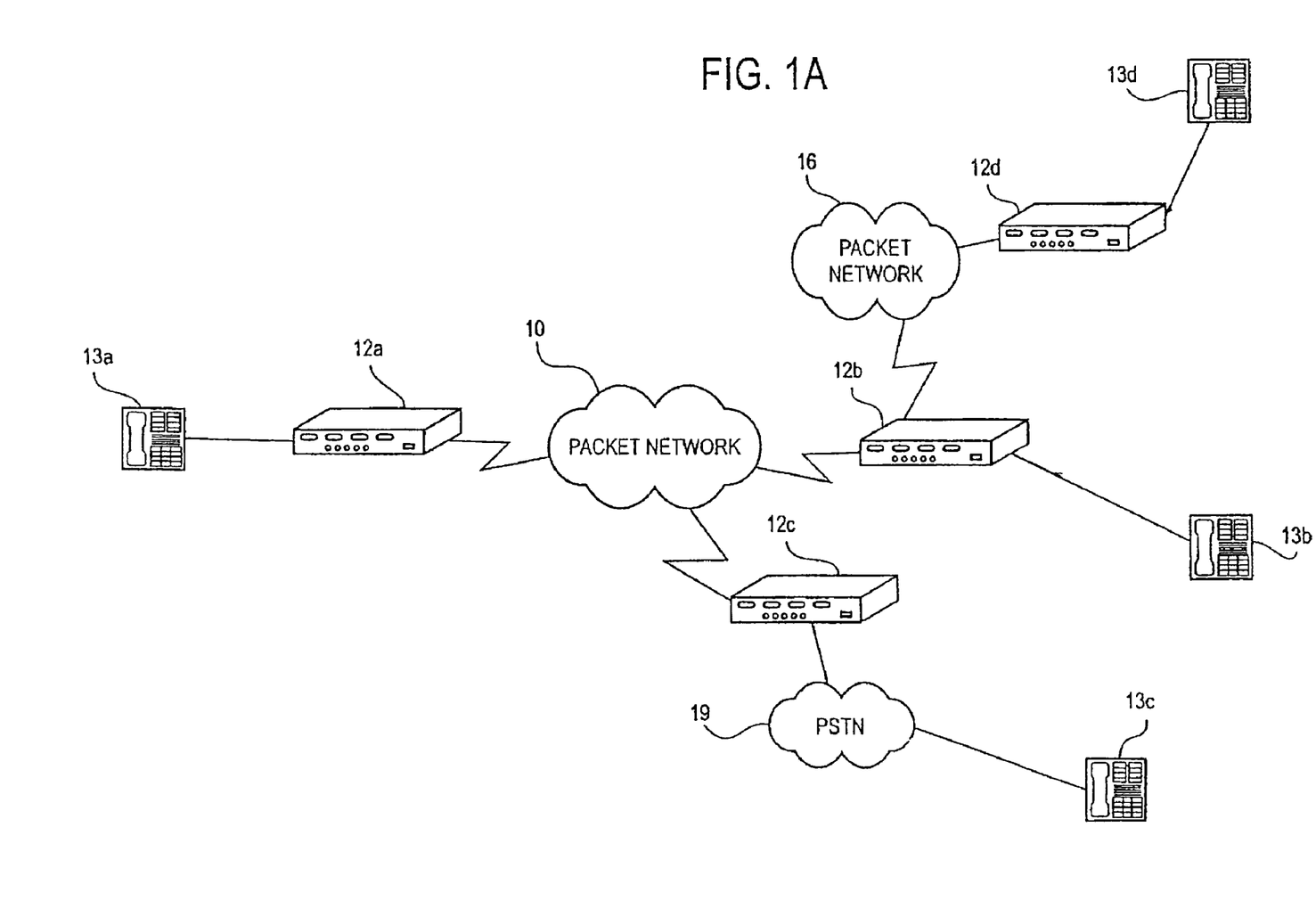
FIG. 1A is a functional block diagram representing another communication system that enables the transmission of real-time media data over a packet-based system.

Another exemplary topology is shown in FIG. 1A. The topology of FIG. 1A is similar to that of FIG. 1 but includes a second packet-based network 16 that is connected to packet-based network 10 and to telephony device 13b via network gateway 12b. The signal processing system of network gateway 12b provides an interface between packet-based network 10 and packet-based network 16 in addition to an interface between packet-based networks 10, 16 and telephony device 13b. Network gateway 12d includes a signal processing system that provides an interface between packet-based network 16 and telephony device 13d.

Figure 2:
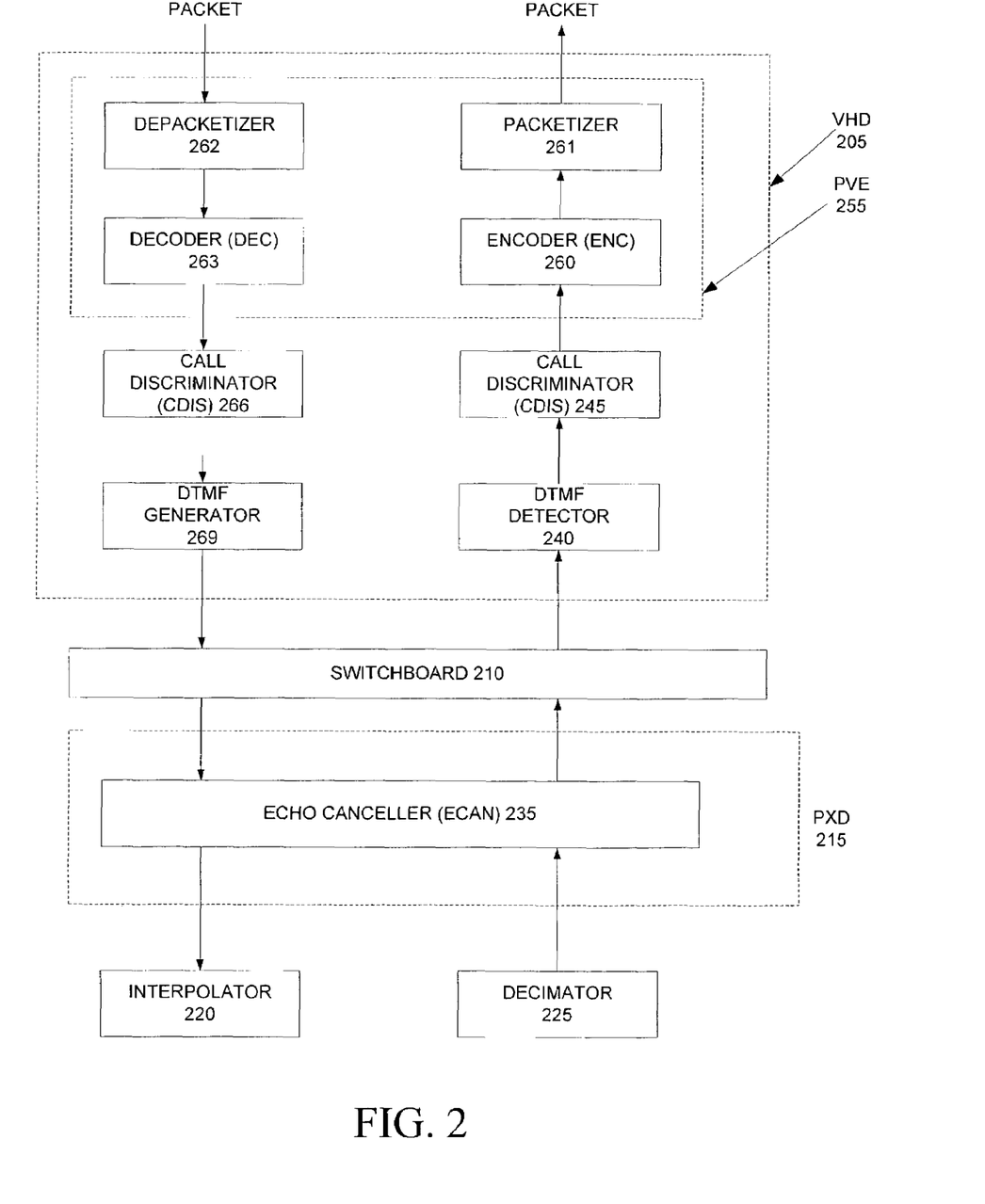
FIG. 2 is a block diagram of an exemplary embodiment illustrating the services invoked by a packet voice transceiver system, in accordance with the present invention.

Referring now to FIG. 2, there is illustrated a signal flow diagram of a packet voice transceiver system 200, in accordance with an embodiment of the present invention. In an illustrative embodiment of the present invention, the packet voice transceiver system 200 may reside in a network gateway such as network gateways 12a, 12b, 12c of FIG. 1, and 12a, 12b, 12c, and 12d of FIG. 1A. In an exemplary embodiment, packet voice transceiver system 200 provides two-way communication with a telephone or a circuit-switched network, such as a PSTN line (e.g. DS0). The packet voice transceiver 200 includes a Virtual Hausware Driver (VHD) 205, a switchboard 210, a physical device driver (PXD) 215, an interpolator 220, and a decimator 225.

The VHD 205 is a logical interface to a telephony device such as 13a, 13b, and 13c of FIG. 1, via the packet network 10, and performs functions such as voice encoding and decoding, media queue management, dual tone multi-frequency (DTMF) detection and generation, and call discrimination (CDIS). During a communication session (e.g., voice, video, fax) each telephony device associates a VHD 205 with each of the telephony device(s) with which it is communicating. For example, during a voice-over-packet (VoIP) network call between telephony devices 13a and 13b, telephony device 13a associates a VHD 205 with telephony device 13b, and telephony device 13b associates a VHD 205 with telephony device 13a. Communication between telephony devices 13a and 13b takes place through their respective VHD205, and packet network 10.

The switchboard 210 associates the VHD 205 and the PXD 215 engaged in a communication session by supporting the connection and combination of data streams from the VHD205 and PXD215 assigned to the telephony devices participating in the session.

The PXD 215 represents an interface for transmitting and receiving the input and output signals to and from the user, and performs various functions including, for example, echo cancellation. As shown in FIG. 2, the top of the PXD 215 interfaces with switchboard 210, while the bottom of the PXD 215 passes data to the interpolator 220 and receives data from decimator 225. The functions within a wideband PXD 215 may be designed to use, for example, 16 kHz sampled data, while functions in a narrowband PXD 215 may expect to process, for example, 8 kHz sampled data.

A wideband system may contain a mix of narrowband and wideband VHDs 205 and PXDs 215. A difference between narrowband and wideband device drivers is their ingress and egress sample buffer interface. A wideband VHD 205 or PXD 215 has wideband data at its sample buffer interface and includes wideband services and functions. A narrowband VHD 205 or PXD 215 has narrowband data at its sample buffer interface and can include narrowband services and functions. The switchboard interfaces with narrowband and wideband VHDs 205 and PXDs 215 through their sample buffer interfaces. The switchboard 210 is incognizant of the wideband or narrowband nature of the device drivers, but is aware of the sampling rate of the data that it reads and writes data through the sample buffer interfaces. To accommodate differences in the sampling rates of data streams, an embodiment of the present invention may upsample data received from narrowband sources and downsample data being sent to narrowband destinations. The sample buffer interfaces may provide data at any arbitrary sampling rate. In an embodiment of the present invention, the narrowband sample buffer interface may provide data sampled at 8 kHz and the wideband sample buffer interface may provide data sampled at 16 kHz. Additionally, a VHD 205 may be dynamically changed between wideband and narrowband and vice versa.

The VHD 205 and PXD 215 driver structures may include sample rate information to identify the sampling rates of the wideband and narrowband data. The information may be part of the interface structure that the switchboard understands and may contain a buffer pointer and an enumeration constant or the number of samples to indicate the sample rate.

The packet voice transceiver system 200 is also characterized by an ingress path and an egress path, in which the ingress path transmits user packets to a packet network such as, for example, packet network 10 of FIG. 1, and the egress path receives user packets from a packet network such as, for example, packet network 10 of FIG. 1. The ingress path and the egress path can either operate in a wideband support mode or a narrowband support mode, and the ingress path and the egress path are not required to operate in the same mode. For example, the ingress path can operate in the wideband support mode, while the egress path operates in the narrowband mode.

In the exemplary embodiment shown in FIG. 2, the ingress path comprises the decimator 225, echo canceller 235, switchboard 210, and services including but not limited to DTMF detector 240 and CDIS 245, and packet voice engine (PVE) 255 comprising an encoder algorithm 260, and packetization function 261. In the ingress path of a wideband device, the decimator 225 receives the user inputs and provides, for example, 16 kHz sampled data for an 8 kHz band-limited signal. The 16 kHz sampled data is transmitted through echo canceller 235 and switchboard 210 to the VHD 205 associated with the destination telephony device. In some cases, the DTMF detector 240 may be designed for operation on only narrowband digitized samples, and the wideband data may be downsampled and passed to DTMF detector 240. Similarly, where CDIS 245 is designed for operation on only narrowband digitized samples, downsampled wideband data may be provided to CDIS 245, which distinguishes a voice call from a facsimile transmission.

The PVE 255 is responsible for issuing media queue mode change commands consistent with the active voice encoder and decoder. The media queues can comprise, for example, the media queues described in patent application Ser. No. 10/313,826, "Method and System for an Adaptive Multimode Media Queue", filed Dec. 6, 2002, which is incorporated herein by reference in its entirety. The PVE 255 ingress thread receives raw samples from other functions within VHD 205. Depending upon the operating mode of VHD 205, the raw samples include either narrowband or wideband data. At PVE 255, encoder 260 encodes and packetizes the sampled data into compressed speech frames for transmission over a packet network such as, for example, packet network 10 of FIG. 1. The encoder 260 can comprise, for example, the BroadVoice 32 Encoder made by Broadcom, Inc.

The egress path comprises depacketizer 262, decoder 263, CDIS 266, DTMF generator 269, switchboard 210, echo canceller 235, and interpolator 220. The depacketizer 262 receives data packets from a packet network such as, for example packet network 10 of FIG. 1, passing the compressed speech frames to the decoder 263. The decoder 263 can comprise, for example, the BroadVoice 32 decoder made by Broadcom, Inc. The decoder 263 decodes the compressed speech frames received from the depacketizer 262 and may provide wideband sampled data. If CDIS 266 and DTMF generator support 16 kHz sampled data, the 16 kHz sampled data is provided to CDIS 266 and DTMF generator 269. Again, in one embodiment, where CDIS 266 and DTMF generator 269 require narrowband digitized samples, the wideband data may be downsampled and used by CDIS 266 and the DTMF generator 269.

The DTMF generator 269 generates DTMF tones if detected in the data packets received from the sending telephony device 13a, 13b, and 13c. These tones may be written to the wideband data to be passed to switchboard 210. The wideband data is received by the switchboard 210, which provides the data to the PXD 215. The sampled data is passed through the echo canceller 235 and provided to interpolator 220.

Figure 3:
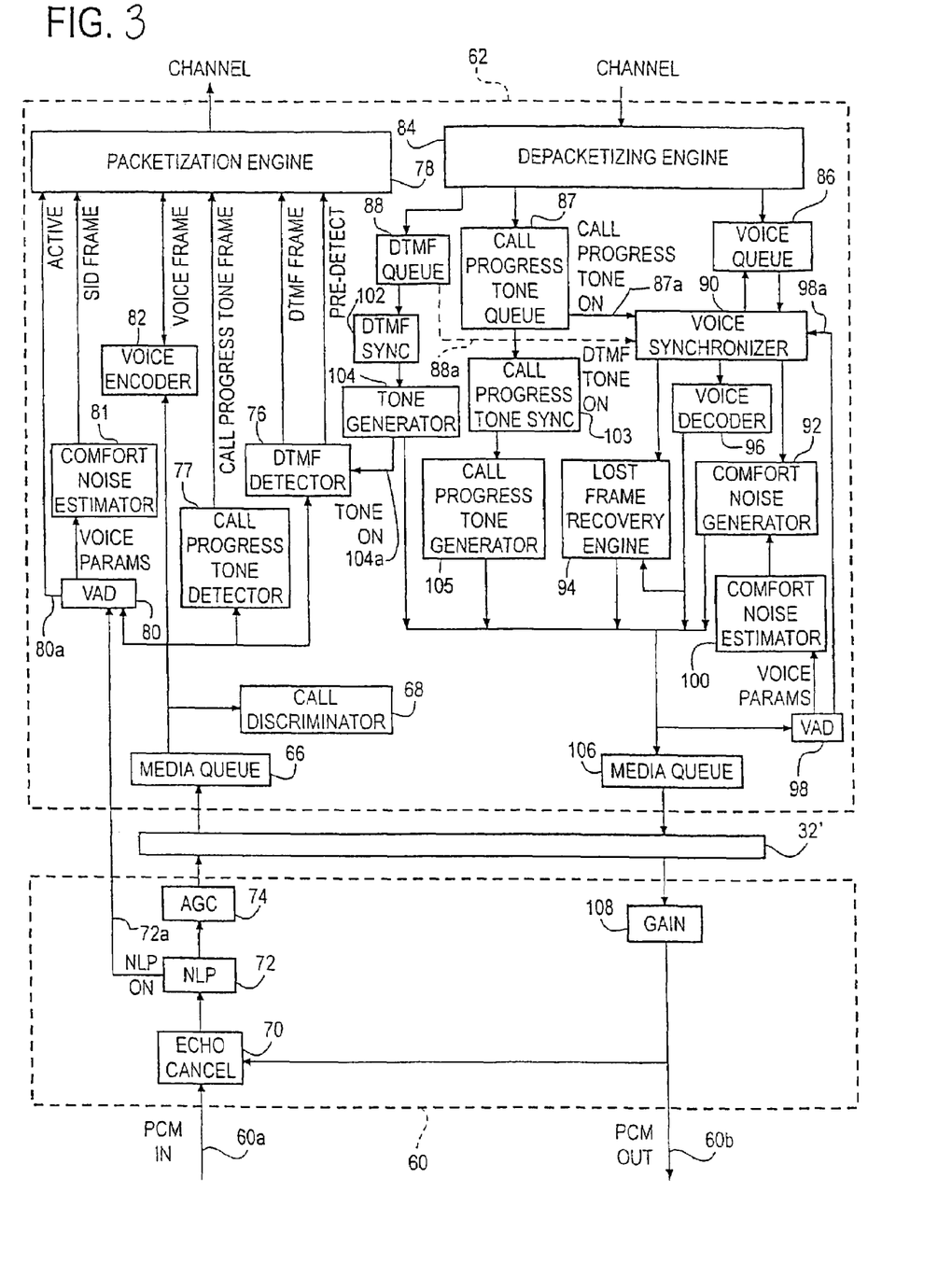
FIG. 3 is a more detailed block diagram showing the network services invoked by the network VHD operating in the voice mode and the associated PXD.

FIG. 3 is a more detailed block diagram showing the network services invoked by the network VHD 62 in the voice mode and the associated PXD 60. In the described exemplary embodiment, the PXD 60 provides two-way communication with a telephone or a circuit-switched network, such as a PSTN line (e.g. DS0) carrying a 64 kb/s pulse code modulated (PCM) signal, i.e., digital voice samples.

The incoming PCM signal 60a is initially processed by the PXD 60 to remove far-end echoes that might otherwise be transmitted back to the far-end user. As the name implies, echoes in telephone systems are the return of the talker's voice resulting from the operation of the hybrid with its two-four wire conversion. If there is low end-to-end delay, echo from the far end is equivalent to side-tone (echo from the near-end), and therefore, not a problem. Side-tone gives users feedback as to how loudly they are talking, and indeed, without side-tone, users tend to talk too loudly. However, far-end echo delays of more than about 10 to 30 msec significantly degrade the voice quality and are a major annoyance to the user.

An echo canceller 70 is used to remove echoes from far-end speech present on the incoming PCM signal 60a before routing the incoming PCM signal 60a back to the far-end user. The echo canceller 70 samples an outgoing PCM signal 60b from the far-end user, filters it, and combines it with the incoming PCM signal 60a. Preferably, the echo canceller 70 is followed by a non-linear processor (NLP) 72 which may mute the digital voice samples when far-end speech is detected in the absence of near-end speech. The echo canceller 70 may also inject comfort noise which in the absence of near-end speech may be roughly at the same level as the true background noise or at a fixed level.

After echo cancellation, the power level of the digital voice samples is normalized by an automatic gain control (AGC) 74 to ensure that the conversation is of an acceptable loudness. Alternatively, the AGC can be performed before the echo canceller 70. However, this approach would entail a more complex design because the gain would also have to be applied to the sampled outgoing PCM signal 60b. In the described exemplary embodiment, the AGC 74 is designed to adapt slowly, although it should adapt fairly quickly if overflow or clipping is detected. The AGC adaptation should be held fixed if the NLP 72 is activated.

After AGC, the digital voice samples are placed in the media queue 66 in the network VHD 62 via the switchboard 32'. In the voice mode, the network VHD 62 invokes three services, namely call discrimination, packet voice exchange, and packet tone exchange. The call discriminator 68 analyzes the digital voice samples from the media queue to determine whether a 2100 Hz tone, a 1100 Hz tone or V.21 modulated HDLC flags are present. If either tone or HDLC flags are detected, the voice mode services are terminated and the appropriate service for fax or modem operation is initiated. In the absence of a 2100 Hz tone, a 1100 Hz tone, or HDLC flags, the digital voice samples are coupled to the encoder system which includes a voice encoder 82, a voice activity detector (VAD) 80, a comfort noise estimator 81, a DTMF detector 76, a call progress tone detector 77 and a packetization engine 78.

Typical telephone conversations have as much as sixty percent silence or inactive content. Therefore, high bandwidth gains can be realized if digital voice samples are suppressed during these periods. A VAD 80, operating under the packet voice exchange, is used to accomplish this function. The VAD 80 attempts to detect digital voice samples that do not contain active speech. During periods of inactive speech, the comfort noise estimator 81 couples silence identifier (SID) packets to a packetization engine 78. The SID packets contain voice parameters that allow the reconstruction of the background noise at the far end.

From a system point of view, the VAD 80 may be sensitive to the change in the NLP 72. For example, when the NLP 72 is activated, the VAD 80 may immediately declare that voice is inactive. In that instance, the VAD 80 may have problems tracking the true background noise level. If the echo canceller 70 generates comfort noise during periods of inactive speech, it may have a different spectral characteristic from the true background noise. The VAD 80 may detect a change in noise character when the NLP 72 is activated (or deactivated) and declare the comfort noise as active speech. For these reasons, the VAD 80 should generally be disabled when the NLP 72 is activated. This is accomplished by a "NLP on" message 72a passed from the NLP 72 to the VAD 80.

The voice encoder 82, operating under the packet voice exchange, can be a straight 16-bit PCM encoder or any voice encoder which supports one or more of the standards promulgated by ITU. The encoded digital voice samples are formatted into a voice packet (or packets) by the packetization engine 78. These voice packets are formatted according to an applications protocol and sent to the host (not shown). The voice encoder 82 is invoked only when digital voice samples with speech are detected by the VAD 80. Since the packetization interval may be a multiple of an encoding interval, both the VAD 80 and the packetization engine 78 should cooperate to decide whether or not the voice encoder 82 is invoked. For example, if the packetization interval is 10 msec and the encoder interval is 5 msec (a frame of digital voice samples is 5 ms), then a frame containing active speech should cause the subsequent frame to be placed in the 10 ms packet regardless of the VAD state during that subsequent frame. This interaction can be accomplished by the VAD 80 passing an "active" flag 80a to the packetization engine 78, and the packetization engine 78 controlling whether or not the voice encoder 82 is invoked.

In the described exemplary embodiment, the VAD 80 is applied after the AGC 74. This approach provides optimal flexibility because both the VAD 80 and the voice encoder 82 are integrated into some speech compression schemes such as those promulgated in ITU Recommendations G.729 with Annex B VAD (March 1996)—Coding of Speech at 8 kbits/s Using Conjugate-Structure Algebraic-Code-Exited Linear Prediction (CS-ACELP), and G.723.1 with Annex A VAD (March 1996)—Dual Rate Coder for Multimedia Communications Transmitting at 5.3 and 6.3 kbit/s, the contents of which is hereby incorporated herein by reference as though set forth in full herein.

Operating under the packet tone exchange, a DTMF detector 76 determines whether or not there is a DTMF signal present at the near end. The DTMF detector 76 also provides a pre-detection flag 76a which indicates whether or not it is likely that the digital voice sample might be a portion of a DTMF signal. If so, the pre-detection flag 76a is relayed to the packetization engine 78 instructing it to begin holding voice packets. If the DTMF detector 76 ultimately detects a DTMF signal, the voice packets are discarded, and the DTMF signal is coupled to the packetization engine 78. Otherwise the voice packets are ultimately released from the packetization engine 78 to the host (not shown). The benefit of this method is that there is only a temporary impact on voice packet delay when a DTMF signal is pre-detected in error, and not a constant buffering delay. Whether voice packets are held while the pre-detection flag 76a is active could be adaptively controlled by the user application layer.

Similarly, a call progress tone detector 77 also operates under the packet tone exchange to determine whether a precise signaling tone is present at the near end. Call progress tones are those which indicate what is happening to dialed phone calls. Conditions like busy line, ringing called party, bad number, and others each have distinctive tone frequencies and cadences assigned them. The call progress tone detector 77 monitors the call progress state, and forwards a call progress tone signal to the packetization engine to be packetized and transmitted across the packet based network. The call progress tone detector may also provide information regarding the near end hook status which is relevant to the signal processing tasks. If the hook status is on hook, the VAD should preferably mark all frames as inactive, DTMF detection should be disabled, and SID packets should only be transferred if they are required to keep the connection alive.

The decoding system of the network VHD 62 essentially performs the inverse operation of the encoding system. The decoding system of the network VHD 62 comprises a de-packetizing engine 84, a voice queue 86, a DTMF queue 88, a precision tone queue 87, a voice synchronizer 90, a DTMF synchronizer 102, a precision tone synchronizer 103, a voice decoder 96, a VAD 98, a comfort noise estimator 100, a comfort noise generator 92, a lost packet recovery engine 94, a tone generator 104, and a precision tone generator 105.

The de-packetizing engine 84 identifies the type of packets received from the host (i.e., voice packet, DTMF packet, call progress tone packet, SID packet), transforms them into frames which are protocol independent. The de-packetizing engine 84 then transfers the voice frames (or voice parameters in the case of SID packets) into the voice queue 86, transfers the DTMF frames into the DTMF queue 88 and transfers the call progress tones into the call progress tone queue 87. In this manner, the remaining tasks are, by and large, protocol independent.

A jitter buffer is utilized to compensate for network impairments such as delay jitter caused by packets not arriving with the same relative timing in which they were transmitted. In addition, the jitter buffer compensates for lost packets that occur on occasion when the network is heavily congested. In the described exemplary embodiment, the jitter buffer for voice includes a voice synchronizer 90 that operates in conjunction with a voice queue 86 to provide an isochronous stream of voice frames to the voice decoder 96.

Sequence numbers embedded into the voice packets at the far end can be used to detect lost packets, packets arriving out of order, and short silence periods. The voice synchronizer 90 can analyze the sequence numbers, enabling the comfort noise generator 92 during short silence periods and performing voice frame repeats via the lost packet recovery engine 94 when voice packets are lost. SID packets can also be used as an indicator of silent periods causing the voice synchronizer 90 to enable the comfort noise generator 92. Otherwise, during far-end active speech, the voice synchronizer 90 couples voice frames from the voice queue 86 in an isochronous stream to the voice decoder 96. The voice decoder 96 decodes the voice frames into digital voice samples suitable for transmission on a circuit switched network, such as a 64 kb/s PCM signal for a PSTN line. The output of the voice decoder 96 (or the comfort noise generator 92 or lost packet recovery engine 94 if enabled) is written into a media queue 106 for transmission to the PXD 60.

The comfort noise generator 92 provides background noise to the near-end user during silent periods. If the protocol supports SID packets, (and these are supported for VTOA, FRF-11, and VoIP), the comfort noise estimator at the far-end encoding system should transmit SID packets. Then, the background noise can be reconstructed by the near-end comfort noise generator 92 from the voice parameters in the SID packets buffered in the voice queue 86. However, for some protocols, namely, FRF-11, the SID packets are optional, and other far-end users may not support SID packets at all. In these systems, the voice synchronizer 90 continues to operate properly. In the absence of SID packets, the voice parameters of the background noise at the far end can be determined by running the VAD 98 at the voice decoder 96 in series with a comfort noise estimator 100.

Preferably, the voice synchronizer 90 is not dependent upon sequence numbers embedded in the voice packet. The voice synchronizer 90 can invoke a number of mechanisms to compensate for delay jitter in these systems. For example, the voice synchronizer 90 can assume that the voice queue 86 is in an underflow condition due to excess jitter and perform packet repeats by enabling the lost frame recovery engine 94. Alternatively, the VAD 98 at the voice decoder 96 can be used to estimate whether or not the underflow of the voice queue 86 was due to the onset of a silence period or due to packet loss. In this instance, the spectrum and/or the energy of the digital voice samples can be estimated and the result 98a fed back to the voice synchronizer 90. The voice synchronizer 90 can then invoke the lost packet recovery engine 94 during voice packet losses and the comfort noise generator 92 during silent periods.

When DTMF packets arrive, they are de-packetized by the de-packetizing engine 84. DTMF frames at the output of the de-packetizing engine 84 are written into the DTMF queue 88. The DTMF synchronizer 102 couples the DTMF frames from the DTMF queue 88 to the tone generator 104. Much like the voice synchronizer, the DTMF synchronizer 102 is employed to provide an isochronous stream of DTMF frames to the tone generator 104. Generally speaking, when DTMF packets are being transferred, voice frames should be suppressed. To some extent, this is protocol dependent. However, the capability to flush the voice queue 86 to ensure that the voice frames do not interfere with DTMF generation is desirable. Essentially, old voice frames which may be queued are discarded when DTMF packets arrive. This will ensure that there is a significant gap before DTMF tones are generated. This is achieved by a "tone present" message 88a passed between the DTMF queue and the voice synchronizer 90.

The tone generator 104 converts the DTMF signals into a DTMF tone suitable for a standard digital or analog telephone. The tone generator 104 overwrites the media queue 106 to prevent leakage through the voice path and to ensure that the DTMF tones are not too noisy.

There is also a possibility that DTMF tone may be fed back as an echo into the DTMF detector 76. To prevent false detection, the DTMF detector 76 can be disabled entirely (or disabled only for the digit being generated) during DTMF tone generation. This is achieved by a "tone on" message 104a passed between the tone generator 104 and the DTMF detector 76. Alternatively, the NLP 72 can be activated while generating DTMF tones.

When call progress tone packets arrive, they are de-packetized by the de-packetizing engine 84. Call progress tone frames at the output of the de-packetizing engine 84 are written into the call progress tone queue 87. The call progress tone synchronizer 103 couples the call progress tone frames from the call progress tone queue 87 to a call progress tone generator 105. Much like the DTMF synchronizer, the call progress tone synchronizer 103 is employed to provide an isochronous stream of call progress tone frames to the call progress tone generator 105. And much like the DTMF tone generator, when call progress tone packets are being transferred, voice frames should be suppressed. To some extent, this is protocol dependent. However, the capability to flush the voice queue 86 to ensure that the voice frames do not interfere with call progress tone generation is desirable. Essentially, old voice frames which may be queued are discarded when call progress tone packets arrive to ensure that there is a significant inter-digit gap before call progress tones are generated. This is achieved by a "tone present" message 87a passed between the call progress tone queue 87 and the voice synchronizer 90.

The call progress tone generator 105 converts the call progress tone signals into a call progress tone suitable for a standard digital or analog telephone. The call progress tone generator 105 overwrites the media queue 106 to prevent leakage through the voice path and to ensure that the call progress tones are not too noisy.

The outgoing PCM signal in the media queue 106 is coupled to the PXD 60 via the switchboard 32'. The outgoing PCM signal is coupled to an amplifier 108 before being outputted on the PCM output line 60b.

Referring for a moment to FIG. 2, the functionality of the VHD 205 is responsible for processing the egress packet stream or "voice channel" received from each of the far-end packet voice transceiver systems 200 engaged in a communication session. For example, in a call involving three participants using telephony devices 13a, 13b, and 13d of FIG. 1A, the packet voice transceiver 200 associated with each telephony device may process two voice channels using two VHD 205s, one for each of the two other telephony devices. The jitter buffer within the decoder 263 of each VHD 205 compensates for irregularities in the arrival of voice packets from the associated far-end packet voice transceiver 200, by storing speech data sufficient to bridge delays in packet arrival. The amount of memory needed for the jitter buffer in decoder 263 depends upon a number of factors including but not limited to the expected network delay jitter, and the rate at which the contents is consumed by playback. In the case of the packet voice transceiver 200 of FIG. 2, an amount of data equivalent to 300 milliseconds (ms) of speech playback may need to be buffered to avoid audible impairments due to network delay jitter. Depending upon network conditions, a greater or lesser amount of memory may be needed. In addition, the actual amount of jitter buffer space needed for the storage of 300 ms of speech data varies based upon the algorithm used to encode the speech. For example, speech encoded using the International Telecommunications Union—Telecommunications Standards Sector (ITU-T) G.711 standard may require 1200 16-bit words for the storage of 300 ms worth of compressed speech data, and an additional 300 16-bit words for the storage of the associated packet headers. In contrast a voice coder such as the BV32 encoder by Broadcom, Inc. may require only 600 16-bit words for speech data storage, half that of the G.711 standard.

Figure 4:
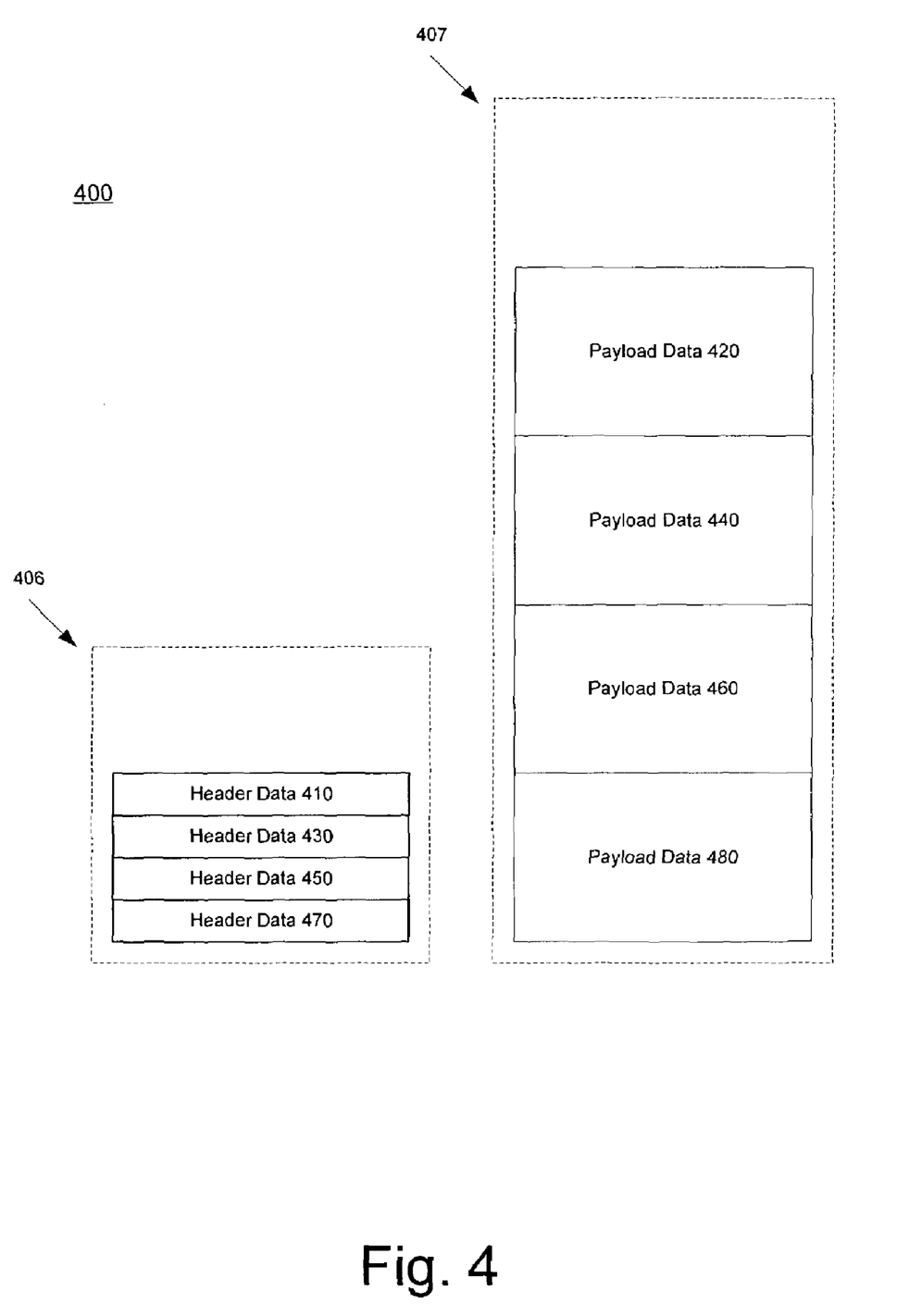
FIG. 4 shows a block diagram illustrating the storage arrangement of a jitter buffer in which the header data and payload data have been stored in separate memory areas having different speed of access, in accordance with the present invention.

FIG. 4 shows a block diagram illustrating the storage arrangement of a jitter buffer 400 in which the header data and payload data have been stored in separate memory areas having different speed of access, in accordance with the present invention. The jitter buffer 400 may correspond, for example, to the jitter buffer used by the decoder 263 of FIG. 2, or by the voice queue 86 of FIG. 3. As described above, a decoder such as the decoder 263 of FIG. 2 may use a jitter buffer 400 in the processing of each voice channel. In the exemplary embodiment of FIG. 4, the memory space allocated for jitter buffer 400 has been partitioned into two segments, a header memory 406 and a payload memory 407. In the illustration of FIG. 4, four voice packets have been separated into a header data portion and a payload data portion. The header data portion of each of the four packets is stored in header memory 406 as header data 410, 430, 450, and 470, while the payload data portion of each of the four packets is stored in payload memory 407 as payload data 420, 440, 460, and 480, respectively. For ease of understanding, the illustration of FIG. 4 shows the header data and payload data portions corresponding to only four voice packets. An embodiment of the present invention is not limited in this manner, and may be adapted for use with the header data and payload data from a greater or lesser number of packets, without departing from the spirit of the invention.

The algorithms used in the jitter buffer of decoder 263 of FIG. 2 may include, for example, the tracking of network delay jitter, the detection of packets that are received out of order or lost, and the calculation of the time of release of the packets to the speech decoding algorithms. In performing these and other functions, the jitter buffer and decoder algorithms typically make frequent use of the information contained within the header data 410, 430, 450, and 470. In addition, algorithm "instance" data are heavily accessed during the operation of the jitter buffer and decoder algorithms. In order to maximize the throughput of those algorithms, an embodiment in accordance with the present invention may store header data 410, 430, 450, and 470, and algorithm instance data (not shown) in memory that allows the fastest possible access.

Although the header data 410, 430, 450, and 470, and algorithm instance data may be needed on a frequent basis, the payload data 420, 440, 460, and 480 may be needed only when decoding of the speech data takes place. The payload data from each network packet represents speech playback of a limited duration, for example, 5 milliseconds. Depending upon the speed of the processor used in the implementation of the decoder 263, the decoding of the speech data contained within payload data 420, 440, 460, and 480 may take only a small fraction of the time of the actual speech playback. Actual playback of the speech data contained within the payload data 420, 440, 460, and 480 may involve infrequent and limited access to memory, when compared to that for the header data 410, 430, 450, and 470.

Figure 5:
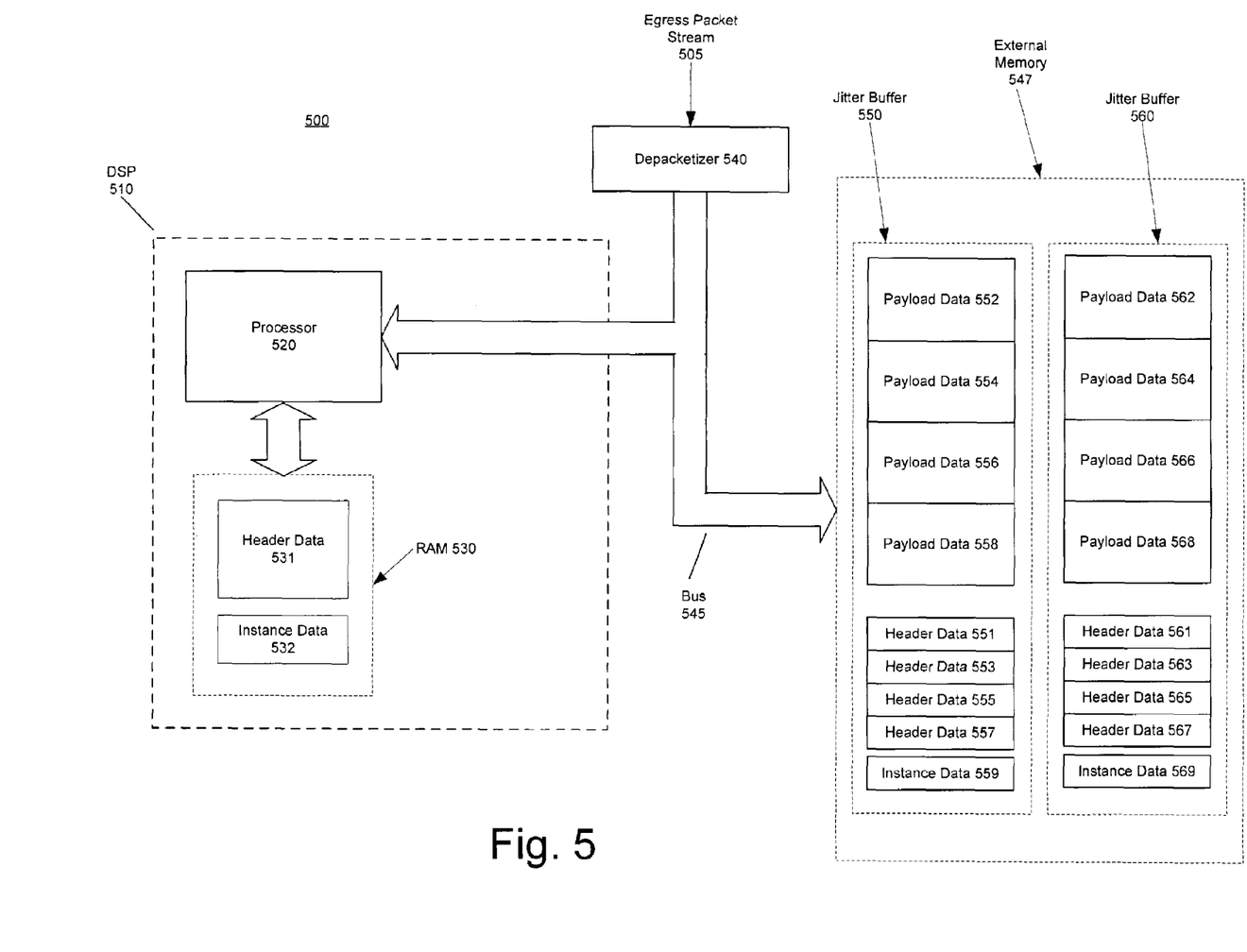
FIG. 5 shows a block diagram of an exemplary decoder that may correspond, for example, to the decoder of FIG. 2, in accordance with the present invention.

FIG. 5 shows a block diagram of an exemplary decoder 500 that may correspond, for example, to the decoder 263 of FIG. 2, in accordance with the present invention. In the illustration of FIG. 5, decoder 500 comprises digital signal processor (DSP) 510, depacketizer 540, external memory 547, and bus 545. The DSP 510 is further comprised of central processing unit (CPU) 520 and random access memory (RAM) 530. External memory 547 is partitioned into one jitter buffer for each channel of real-time data supported by the decoder 500, in this case jitter buffer 550 and jitter buffer 560.

In the exemplary decoder 500 of FIG. 5, depacketizer 540 receives packets from egress packet stream 505. Egress packet stream 505 may correspond, for example, to a stream of packets from packet network 10 of FIG. 1. Depacketizer 540 disassembles each received packet and stores the packet contents into jitter buffer 550 or jitter buffer 560 for the associated speech channel. For example, the header data and the corresponding payload data from a received packet may be stored in jitter buffer 550 of external memory 547, as one of header data 551, 553, 555, and 557, and one of payload data 552, 554, 556, and 558, respectively. In the exemplary embodiment shown in FIG. 5, the header data may include, for example, packet sequence numbers, time stamps, and jitter estimates, while the payload data may comprise, for example, compressed speech, music, or video data.

In the exemplary embodiment shown in FIG. 5, the RAM 530 is arranged to contain header data 531 and algorithm instance data 532. The RAM 530 may reside on the same integrated circuit (IC) as the CPU 520, allowing the CPU 520 to have the fastest possible access to the contents of the RAM 530. Although the RAM 530 is shown as being connected only to the CPU 520, the RAM 530 may be connected to bus 545 and operate in a dual-port fashion with depacketizer 540, without departing from the spirit of the present invention. The RAM 530 may be capable of storing, for example, 32 kilobytes of data, and may be limited in size due to the cost of the chip area occupied by the RAM 530. In an embodiment of the present invention, external memory 547 may be considerably larger that the RAM 530 and may be, for example, several megabytes in size. The speed of access to the external memory 547 by the CPU 520 may be considerably slower than the access to the RAM 530.

An embodiment in accordance with the present invention may take advantage of the relatively high speed of the DSP 510 and RAM 530 by keeping the most frequently used information, the header data and the algorithm instance data, within the RAM 530 during the processing of the associated payload data. Due to the limited size of the RAM 530, an embodiment of the present invention may copy or 'page' portions of the slower external memory 547 into the faster RAM 530, before processing by the CPU 520. As shown in the illustration of FIG. 5, in an embodiment in accordance with the present invention, the RAM 530 has been arranged with space for header data 531 and algorithm instance data 532. The header data 551, 553, 555, and 557 of jitter buffer 550, or header data 561, 563, 565, 567 of jitter buffer 560 is stored within the RAM 530 during processing of the associated payload data by the decoder algorithms. The header data 551, 553, 555, and 557, and header data 561, 563, 565, and 567 may correspond, for example, to header data 410, 430, 450, and 470 of FIG. 4. The RAM 530 may also contain instance data 532. Instance data 532 may correspond, for example, to instance data 559 or 569, and may include, for example, intermediate values of calculations and other algorithm variables used during the decoding of payload data 552, 554, 556, and 558, and payload data 562, 564, 566, and 568, respectively.

In an embodiment in accordance with the present invention, the DSP 510 may periodically perform the decoding functions for multiple speech channels in a round-robin, channel-by-channel fashion. This is because the processing time needed to decode a predetermined amount of the payload data for a channel may be a small fraction of the playback time of the decoded data. For example, let us assume that the speech data for the next channel to be processed is stored in jitter buffer 550. Immediately prior to processing the speech data for the current channel, the CPU 520 may copy the header data 551, 553, 555, and 557, and instance data 559 into the header data 531 portion and the instance data 532 portion of the RAM 530, respectively. The amount of payload data to be processed may represent, for example, 5 ms. of speech playback time. The CPU 520 may then perform the decoding of that portion of payload data 552, 554, 556, and 558 needed for the next interval of speech playback, according to the algorithm used for the current channel. The processing needed to decode 5 ms. of playback may take, for example, 700 microseconds. Upon completion of the processing, the CPU 520 may copy to the header data 551, 553, 555, and 557 of jitter buffer 550, the header data 531 corresponding to those portions of payload data 552, 554, 556, and 558 that have not yet been processed. It may also copy the current instance data 532 to the instance data 559 of jitter buffer 550. The CPU 520 may then copy the header data 561, 563, 565, and 567, and instance data 569 from the jitter buffer 60 to the header data 531 and instance data 532 portions of the RAM 530, respectively, and execute the decoding algorithm for the channel associated with jitter buffer 560.

By storing only the header and instance data for the jitter buffer of a channel in the RAM 530, and storing them in the RAM 530 only during the actual processing of the corresponding payload data, it is possible for an embodiment(s) of the present invention to perform the decoding of a greater number of speech channels than if the entire jitter buffer for all channels were always stored in the RAM 530. In addition, the CPU 520 may have, for example, several MIPS of computing capacity available to perform other signal processing including, but not limited to, for example, tone generation or detection, echo cancellation or suppression, comfort noise generation, or similar functions. The exact amount of processor capacity available depends upon, for example, the number and size of the jitter buffers implemented, and the types of vocoders in use. In an embodiment of the present invention, a fast DSP 510 with a limited amount of RAM 530 may use larger, less expensive external memory 520 to process a larger number of speech channels that prior art solutions. Although described with respect to the processing of speech channels, the present invention is not limited to its use in speech applications, and may have significant utility with other real-time media streams (e.g., music, video, etc.)

Figure 6:
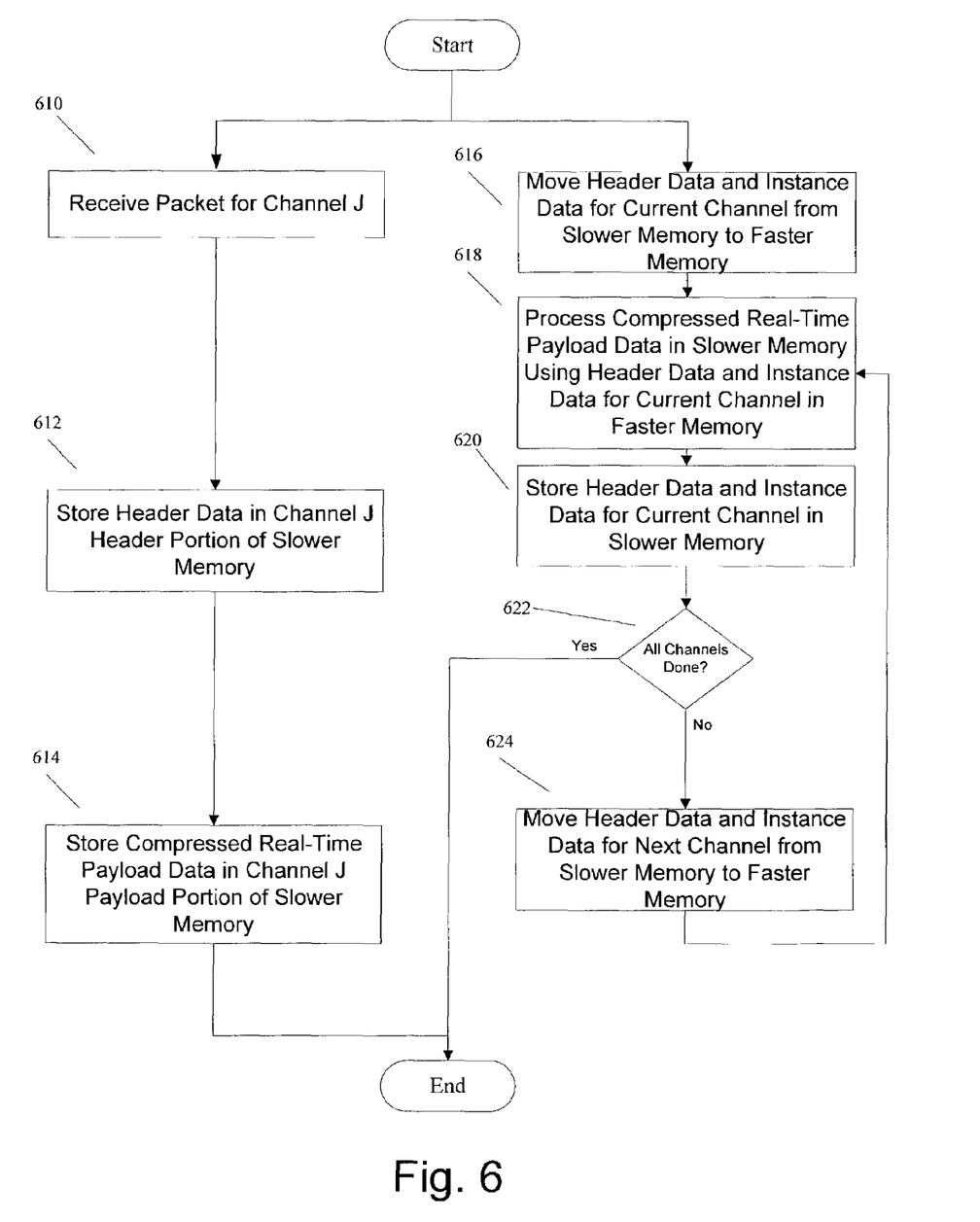
FIG. 6 is a flow chart illustrating a method of operating a decoder, in accordance with the present invention.

FIG. 6 is a flow chart illustrating a method of operating a decoder, in accordance with the present invention. In the flow diagram shown in FIG. 6, two branches are shown, representing two processes that may take place in parallel. The processes illustrated may be performed by one processor, or by a number of processors operating in cooperation, without departing from the spirit of the present invention. In the first branch of FIG. 6, a speech packet for voice channel 'J' is received (block 610), and the header data portion of the packet is stored in a part of a relatively slower, larger first memory (block 612) reserved for the header data of voice channel 'J'. The payload data or compressed speech portion of the received packet is then stored in a separate part of the slower, larger memory (block 614) reserved for the payload data of voice channel 'J'. Although the exemplary method of FIG. 6 is described with respect to speech, the present invention is not limited in this regard, as the present invention is applicable to other real-time media as well.

In the second branch of FIG. 6, a decoder such as, for example, decoder 263 of FIG. 2, processes, in sequence, the payload data for each of the supported voice channels. It begins by copying to a relatively faster, smaller memory all header data and algorithm instance data corresponding to the current channel from a part of the slower, larger memory reserved for header data and algorithm instance data of the current voice channel (block 616). The decoder algorithm then processes the oldest payload data for the current voice channel that is stored in the faster, smaller memory (block 618), using the header data and algorithm instance data stored in the slower, larger memory. Upon completion, the decoder copies header data and algorithm instance data from the faster, smaller memory to the area of the slower, larger memory reserved for the header data and algorithm instance data for the current voice channel (block 620). A check is then made whether processing for all channels has been completed (block 622). If not all channels have been processed, the decoder copies to the faster, smaller memory all header data and algorithm instance data corresponding to the next voice channel from a part of the slower memory reserved for header data and algorithm instance data of the next voice channel (block 624), and the sequence continues until processing for all voice channels is completed.

Although the present invention has been described above primarily with respect to its application to voice communication systems, it is not limited in this regard. The present invention may also be applied to other real-time communication media as well, e.g. music, video, etc., without departing from its spirit or scope.

Accordingly, the present invention may be realized in hardware, software, or a combination of hardware and software.

The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Notwithstanding, the invention and its inventive arrangements disclosed herein may be embodied in other forms without departing from the spirit or essential attributes thereof. Accordingly, reference should be made to the following claims, rather than to the foregoing specification, as indicating the scope of the invention. In this regard, the description above is intended by way of example only and is not intended to limit the present invention in any way, except as set forth in the following claims.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of operating a decoder for decoding a real-time media stream, the method comprising:
   receiving a plurality of data packets, each of the plurality of data packets comprising header data and payload data;
   parsing each of the plurality of data packets into a header data portion and a payload data portion;
   storing the header data portions in a first memory, thereby forming a block of header data;
   storing the payload data portions in the first memory, thereby forming a block of payload data;
   copying the block of header data to a second memory;
   decoding at least a portion of the block of payload data using the block of header data in the second memory; and
   moving at least a modified portion of the block of header data in the second memory to the first memory.

2. The method of claim 1 wherein the payload data comprises compressed speech data.

3. The method of claim 1 wherein the header data comprises at least one of a time stamp, a sequence number, a jitter estimate, and a reference to a location within the first memory.

4. The method of claim 1 wherein the second memory and a digital signal processor are contained within a single integrated circuit device.

5. The method of claim 1 wherein the size of the second memory is a fraction of the size of the first memory.

6. The method of claim 1 wherein the copying, decoding, and moving occur on a periodic basis.

7. The method of claim 6 wherein copying, decoding, and moving occurs at regular time intervals.

8. The method of claim 1 wherein the first memory has a first speed of access and the second memory has a second speed of access faster than the first speed of access.

9. The method of claim 1 wherein the first memory and a digital signal processor are contained within separate integrated circuit devices.

10. The method of claim 1 wherein the plurality of data packets is received over a wireless network.

11. A machine-readable storage, having stored thereon a computer program having a plurality of code sections for implementing a decoder for decoding a real-time media stream, the code sections executable by a machine for causing the machine to perform the operations comprising:
   receiving a plurality of data packets, each of the plurality of data packets comprising header data and payload data;
   parsing each of the plurality of data packets into a header data portion and a payload data portion;
   storing the header data portions in a first memory, thereby forming a block of header data;
   storing the payload data portions in the first memory, thereby forming a block of payload data;
   copying the block of header data to a second memory;
   decoding at least a portion of the block of payload data using the block of header data in the second memory; and
   moving at least a modified portion of the block of header data in the second memory to the first memory.

12. The machine-readable storage of claim 11 wherein the payload data comprises compressed speech data.

13. The machine-readable storage of claim 11 wherein the header data comprises at least one of a time stamp, a sequence number, a jitter estimate, and a reference to a location within the first memory.

14. The machine-readable storage of claim 11 wherein the second memory and a digital signal processor are contained within a single integrated circuit device.

15. The machine-readable storage of claim 11 wherein the size of the second memory is at least an order of magnitude smaller than the size of the first memory.

16. The machine-readable storage of claim 11 wherein the copying, decoding and moving occur on a periodic basis.

17. The machine-readable storage of claim 16 wherein copying, decoding, and moving occurs at regular time intervals.

18. The machine-readable storage of claim 11 wherein the first memory has a first speed of access and the second memory has a second speed of access faster than the first speed of access.

19. The machine-readable storage of claim 11 wherein the first memory and a digital signal processor are contained within separate integrated circuit devices.

20. The machine-readable storage of claim 11 wherein the plurality of data packets is received over a wireless network.

21. One or more circuits for decoding a real-time media stream, the one or more circuits comprising:
   at least one processor enabled to receive a plurality of data packets, each of the plurality of data packets comprising header data and payload data, the at least one processor operable to, at least:
      parse each of the plurality of data packets into a header data portion and a payload data portion;

store the header data portions in a first memory, thereby forming a block of header data;

store the payload data portions in the first memory, thereby forming a block of payload data;

copy the block of header data to a second memory;

decode at least a portion of the block of payload data using the block of header data in the second memory; and move at least a modified portion of the block of header data in the second memory to the first memory.

22. The one or more circuits of claim 21 wherein the payload data comprises compressed speech data.

23. The one or more circuits of claim 21 wherein the header data comprises at least one of a time stamp, a sequence number, a jitter estimate, and a reference to a location within the first memory.

24. The one or more circuits of claim 21 wherein the second memory and a digital signal processor are contained within a single integrated circuit device.

25. The one or more circuits of claim 21 wherein the size of the second memory is a fraction of the size of the first memory.

26. The one or more circuits of claim 21 wherein the copying, decoding, and moving occur on a periodic basis.

27. The one or more circuits of claim 21 wherein copying, decoding, and moving occurs at regular time intervals.

28. The one or more circuits of claim 21 wherein the first memory has a first speed of access and the second memory has a second speed of access faster than the first speed of access.

29. The one or more circuits of claim 21 wherein the first memory and a digital signal processor are contained within separate integrated circuit devices.

30. The one or more circuits of claim 21 wherein the plurality of data packets is received over a wireless network.

* * * * *